(12) United States Patent
Karasaridis

(10) Patent No.: US 9,485,273 B2
(45) Date of Patent: Nov. 1, 2016

(54) SYSTEM AND METHOD TO DIFFUSE DENIAL-OF-SERVICE ATTACKS USING VIRTUAL MACHINES

(71) Applicant: AT&T Intellectual Property I, L.P., Atlanta, GA (US)

(72) Inventor: Anestis Karasaridis, Oceanport, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 58 days.

(21) Appl. No.: 14/564,837

(22) Filed: Dec. 9, 2014

(65) Prior Publication Data

US 2016/0164911 A1 Jun. 9, 2016

(51) Int. Cl.
*H04L 29/06* (2006.01)
*G06F 9/455* (2006.01)

(52) U.S. Cl.
CPC ....... *H04L 63/1458* (2013.01); *G06F 9/45558* (2013.01); *H04L 63/14* (2013.01); *H04L 63/1416* (2013.01); *G06F 2009/45587* (2013.01)

(58) Field of Classification Search
CPC ............... H04L 63/14; H04L 63/1408; H04L 63/1416; H04L 63/1425; H04L 63/1441; H04L 63/1458; H04L 63/1491
See application file for complete search history.

(56) References Cited

U.S. PATENT DOCUMENTS

| | | | |
|---|---|---|---|
| 6,834,310 B2 | 12/2004 | Munger et al. | |
| 7,188,366 B2 | 3/2007 | Chen et al. | |
| 7,549,166 B2 | 6/2009 | Baffes et al. | |
| 7,761,917 B1 | 7/2010 | Kumar | |
| 8,065,725 B2 | 11/2011 | Zheng et al. | |
| 8,117,296 B2 | 2/2012 | Liu et al. | |
| 8,122,505 B2 | 2/2012 | Verma | |
| 8,321,938 B2 | 11/2012 | Strayer et al. | |
| 8,528,091 B2 | 9/2013 | Bowen et al. | |
| 8,549,645 B2 | 10/2013 | Tang et al. | |

(Continued)

FOREIGN PATENT DOCUMENTS

WO 2014118362 8/2014

OTHER PUBLICATIONS

Khattab,"Proactive server roaming for mitigating denial-of-service attacks," Information Technology: Research and Education, 2003. Proceedings. ITRE2003. International Conference, vol., No., pp. 286, 290, Aug. 11-13, 2003.

(Continued)

*Primary Examiner* — Edward Zee
(74) *Attorney, Agent, or Firm* — Akerman LLP; Michael K. Dixon; Mammen (Roy) P. Zachariah, Jr.

(57) ABSTRACT

A system for diffusing denial-of-service attacks by using virtual machines is disclosed. In particular, the system may receive, from a measurement probe, a network transaction measurement associated with a first node in a network. Based on the network transaction measurement, the system may determine if the network transaction measurement satisfies a threshold measurement value. If the network transaction measurement satisfies the threshold measurement value, the system may determine that an attack is occurring at the first node in the network. The system may then identify one or more nodes that have capacity for handling traffic intended for the first node. Once the one or more nodes are identified, the system may launch virtual machines at the one or more nodes to handle legitimate traffic intended for the first node.

20 Claims, 7 Drawing Sheets

(56) References Cited

U.S. PATENT DOCUMENTS

| | | |
|---|---|---|
| 8,793,787 B2 | 7/2014 | Ismael et al. |
| 8,806,630 B2 | 8/2014 | Qiu et al. |
| 9,225,661 B1 * | 12/2015 | Yang ............... G06F 9/5077 |
| 2004/0255137 A1 | 12/2004 | Ying |
| 2006/0195745 A1 | 8/2006 | Keromytis et al. |
| 2010/0071054 A1 | 3/2010 | Hart |
| 2012/0075314 A1 | 3/2012 | Malakapalli et al. |
| 2013/0133068 A1 | 5/2013 | Jiang |
| 2013/0227648 A1 | 8/2013 | Ricci |
| 2013/0263256 A1 | 10/2013 | Dickinson et al. |
| 2014/0105030 A1 | 4/2014 | Kogan |
| 2014/0115706 A1 | 4/2014 | Silva et al. |
| 2014/0283051 A1 * | 9/2014 | Doron ............... H04L 63/1458 726/23 |

OTHER PUBLICATIONS

Lua et al., "Mitigating ddos attacks with transparent and intelligent fast-flux swarm network," Network, IEEE 25.4 (2011): 28-33.

Lonea et al., "Detecting DDoS Attacks in Cloud Computing Environment," International Journal of Computers Communications & Control 8.1 (2012): 70-78.

Vrable et al., "Scalability, fidelity, and containment in the potemkin virtual honeyfarm," ACM SIGOPS Operating Systems Review 39.5 (2005): 148-162.

* cited by examiner

SYSTEM AND METHOD TO DIFFUSE DENIAL-OF-SERVICE ATTACKS USING VIRTUAL MACHINES

FIELD OF THE INVENTION

The present application relates to technologies for handling denial-of-service attacks or other computer-related attacks, and more particularly, to systems and methods for diffusing denial-of-service attacks by using virtual machines.

BACKGROUND

In today's society, end users regularly utilize smartphones, tablets, laptops, computing devices, and other technologies to access media content, access internet websites, access various types of network services, access financial services, access gaming content, perform work, and perform a variety of other tasks and functions. As the number of end users has steadily increased over the years, a substantial number of end users have become increasingly reliant on various network services and programs to perform daily routines and various tasks that would otherwise have been done without such services and programs. As a result, network interruptions or downtime often causes substantial productivity losses, financial losses, and inefficiencies. A significant cause of such network interruptions or downtime are denial-of-service attacks and other types of computer-related attacks. Denial-of-service attacks often consist of malicious high-volume machine-generated service requests that cause server overloads or other bottlenecks in a communications network. Such attacks typically result in the inability to service legitimate requests coming from various end users because servers become overloaded with attack traffic.

Denial-of-service attacks have been steadily growing in volume, and many attacks now include attack traffic being sent at hundreds of gigabytes per second. Additionally, denial-of-service attacks are typically distributed geographically and the true source of the attack is often spoofed, which makes it difficult to block attack traffic at the source of the attack. While various source address verification techniques have been utilized to assist in determining the source of an attack, such techniques have failed to be implemented across internet service providers so as to ensure that the blocking of traffic at the source is effective. Currently, there are two primary approaches for dealing with denial-of-service attacks. The first approach is to apply filters, such as scrubbers, to incoming traffic in order to block malicious requests. Filters, however, are often expensive, take a significant amount of time to activate, and often become a single point of failure. Additionally, filters may also allow for the undesired outcome of blocking legitimate traffic in addition to blocking attack traffic. The second approach is to overprovision server and network resources so as to enable the servers and network resources to absorb high-volume attacks. Notably, however, such overprovisioning is often extremely costly and is also impractical in network areas outside of very critical network infrastructure services.

SUMMARY

A system and accompanying methods for diffusing denial-of-service attacks by using virtual machines are disclosed. In particular, the system and methods may allow for the rapid deployment of virtual machines in a network, such as a cloud-computing network, so that legitimate requests for network services may still be served during an attack. Legitimate clients associated with the legitimate requests may be informed of new available resources provided by virtual machines deployed at servers away from the attack, and may proceed to send the legitimate requests to the virtual machines for processing. Additionally, the systems and methods may include deploying sacrificial virtual machines at various attack points, such as peering links and access links, so as to absorb the attack traffic while the virtual machines deployed away from the attack service the legitimate requests.

In order to accomplish the above, the systems and methods may include placing measurement probes at various points in a network, which may be utilized to collect network and transaction measurements from various virtual machines deployed at various servers in the network. The network and transaction measurements may be sent by the measurement probes to a denial-of-service detection and response (DDoSDR) module, which may analyze the measurements and compare the measurements to a baseline value and various threshold values associated with an attack. If the comparison of the measurements to the thresholds indicates that an attack is occurring, the DDoSDR module may characterize the attack to one or more servers, such as domain name servers. Once the attack is characterized to one or more servers, the DDoSDR module may identify alternate servers and nodes with available capacity for servicing legitimate traffic. The DDoSDR module may then estimate the number and determine the type of virtual machines that need to be deployed at each of the alternate servers and nodes with available capacity.

The DDoSDR module may also identify the network entry points of the attack, such as peering links or access links, and may estimate a number and type of sacrificial virtual machines that are to be deployed near or at the attack entry points. The sacrificial virtual machines may be utilized to absorb the attack traffic, while the virtual machines for the alternate servers and nodes service legitimate traffic. A cloud control function or other function may receive the estimates for the virtual machines and the sacrificial virtual machines from the DDoSDR module, and may deploy the estimated number of virtual machines at the alternate servers and nodes that are away from the entry points of the attack and the sacrificial virtual machines at the attack entry points. The cloud control function may also provision parent authoritative servers, parent nodes, or other similar devices with the addresses and names of the servers and nodes that are hosting the deployed virtual machines. Based on the provisioning at the parent servers and nodes, the legitimate clients may discover the new resources provided by the alternate servers and nodes and may transmit requests to the alternative servers and nodes. The virtual machines deployed at the alternate servers and nodes may then be utilized to process the requests that come from the legitimate clients.

In one embodiment, a system for diffusing denial-of-service attacks by using virtual machines is disclosed. The system may include a memory that stores instructions and a processor that executes the instructions to perform various operations of the system. The system may perform an operation that includes receiving, from a measurement probe, a network transaction measurement associated with a first node in a network. Additionally, the system may perform an operation that includes determining if the network transaction measurement satisfies a threshold measurement value. If the network transaction measurement satisfies the threshold measurement value, the system may perform an operation that includes determining that an attack is occurring at the first node in the network. The system may then perform an operation that includes identifying a second node having a capacity for handling traffic intended for the first node. Finally, the system may perform an operation that includes launching a first quantity of virtual machines at the second node to handle legitimate traffic of the traffic intended for the first node.

In another embodiment, a method for diffusing denial-of-service attacks by using virtual machines is disclosed. The method may include utilizing a memory that stores instructions, and a processor that executes the instructions to perform the various functions of the method. The method may include receiving, from a measurement probe, a network transaction measurement associated with a first node in a network. Additionally, the method may include determining if the network transaction measurement satisfies a threshold measurement value. If the network transaction measurement satisfies the threshold measurement value, the method may include determining that an attack is occurring at the first node in the network. The method may then include identifying a second node having a capacity for handling traffic intended for the first node. Finally, the method may include launching a first quantity of virtual machines at the second node to handle legitimate traffic of the traffic intended for the first node.

According to yet another embodiment, a computer-readable device having instructions for diffusing denial-of-service attacks by using virtual machines is provided. The computer instructions, which when loaded and executed by a processor, may cause the processor to perform operations including: receiving, from a measurement probe, a network transaction measurement associated with a first node in a network; determining if the network transaction measurement satisfies a threshold measurement value; determining, if the network transaction measurement satisfies the threshold measurement value, that an attack is occurring at the first node in the network; identifying a second node having a capacity for handling traffic intended for the first node; and launching a first quantity of virtual machines at the second node to handle legitimate traffic of the traffic intended for the first node.

These and other features of the systems and methods for diffusing denial-of-service attacks by using virtual machines are described in the following detailed description, drawings, and appended claims.

DETAILED DESCRIPTION OF THE INVENTION

Figure 1:
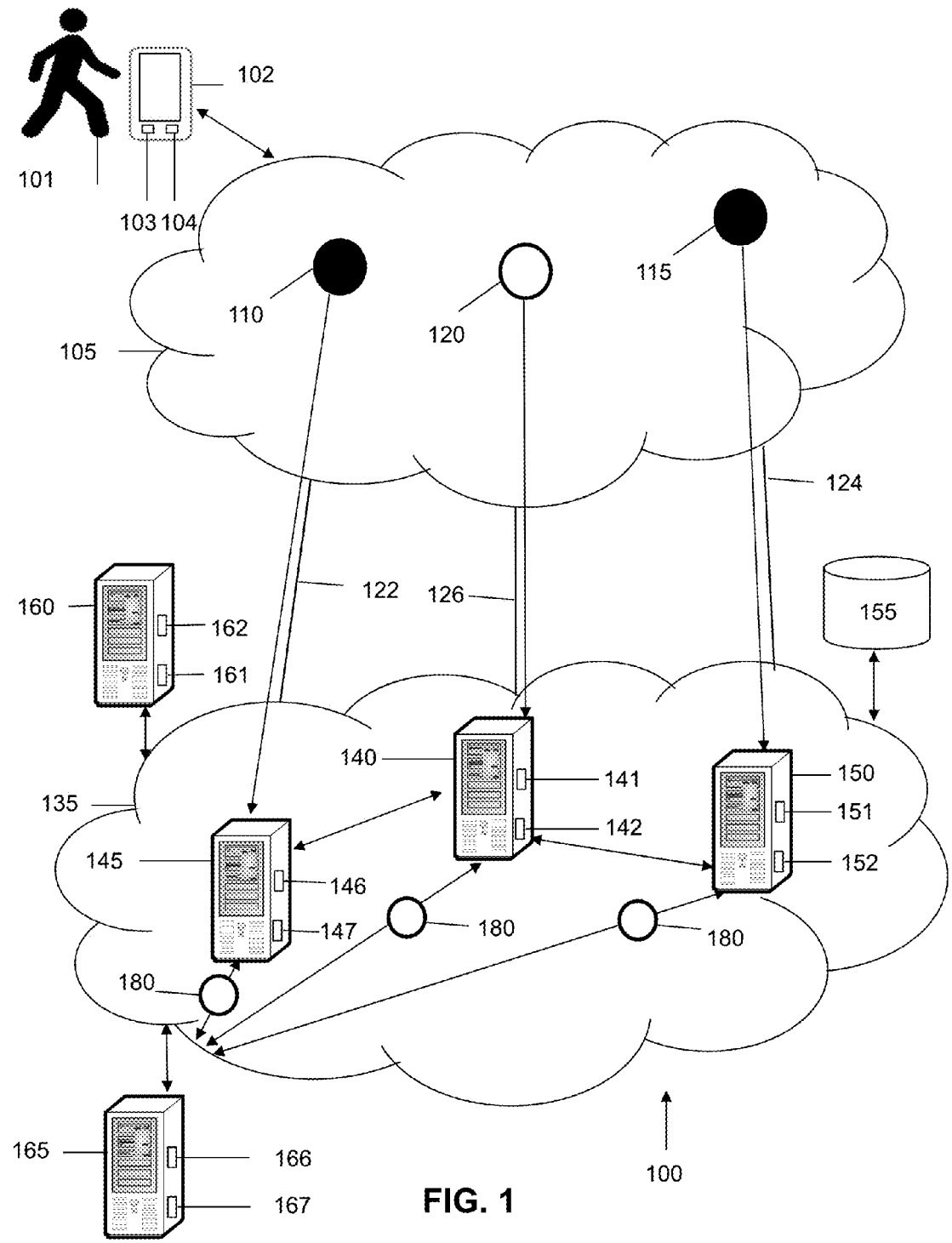
FIG. 1 is a schematic diagram of a system for diffusing denial-of-service attacks by using virtual machines according to an embodiment of the present disclosure.

A system 100 and accompanying methods for diffusing denial-of-service attacks by using virtual machines are disclosed, as shown in FIGS. 1-7. In particular, the system 100 and methods may allow for the rapid deployment of virtual machines in a network, such as communications network 135, so that legitimate requests for network services may still be served during an attack. Legitimate clients, such as legitimate clients 102, 120, associated with the legitimate requests may be informed of new available resources provided by virtual machines deployed at servers away from the attack, and may proceed to send the legitimate requests to the virtual machines for processing. Additionally, the system 100 and methods may include deploying sacrificial virtual machines at sacrificial nodes 185 near various attack points, such as at peering links and access links, so as to absorb the attack traffic, while the virtual machines deployed away from the attack service the legitimate requests.

In order to accomplish the foregoing, the system 100 and methods may include placing measurement probes 180 at various points in a communications network 135, which may be utilized to collect network and transaction measurements from various virtual machines deployed at various servers in the communications network 135. The network and transaction measurements may be sent by the measurement probes 180 to a measurement collection module 170 and a denial-of-service detection and response (DDoSDR) module 171, which may analyze the measurements and compare the measurements to a baseline value and various threshold values associated with an attack. If the comparison of the measurements to the thresholds indicates that an attack is occurring, the DDoSDR module 171 may characterize the attack to one or more servers. Once the attack is characterized to one or more servers, the DDoSDR module 171 may identify alternate servers and nodes with available capacity for servicing legitimate traffic. The DDoSDR module 171 may then estimate the number and determine the type of virtual machines that need to be deployed at each of the alternate servers and nodes with available capacity.

The DDoSDR module 171 may also identify the network entry points of the attack, such as peering links or access links, and may estimate a number and determine a type of sacrificial virtual machines that are to be deployed at sacrificial nodes 185 located near or at the attack entry points. The sacrificial virtual machines may be utilized to absorb the attack traffic, while the virtual machines for the alternate servers and nodes service legitimate traffic from the legitimate clients 102, 120. A cloud control function, such as cloud controller 172, may receive the estimates for the virtual machines and the sacrificial virtual machines from the DDoSDR module 171, and may deploy the estimated number of virtual machines at the alternate servers and nodes that are away from the entry points of the attack and the sacrificial virtual machines at the sacrificial nodes 185 near the attack entry points. The cloud control function may also provision parent authoritative servers, parent nodes 175, or other similar devices with the addresses and names of the servers and nodes that are hosting the deployed virtual machines. Based on the provisioning at the parent servers and nodes, the legitimate clients 102, 120 may discover the new resources provided by the alternate servers and nodes and may transmit requests to the alternate servers and nodes. The virtual machines deployed at the alternate servers and nodes may then be utilized to process the requests that come from the legitimate clients 102, 120.

As shown in FIG. 1, a system 100 for diffusing denial-of-service attacks by using virtual machines is disclosed. The system 100 may be configured to support, but is not limited to, supporting, domain name services, resolver domain name services, content delivery services, communications services, unicast services, multicast services, automatic multicast tunneling services, wireless broadcast services, telephone services, cloud computing services, voice-over-internet protocol services (VoIP), software as a service (SaaS) applications, gaming applications and services, productivity applications and services, mobile applications and services, and any other computing applications and services. The system 100 may include a user 101 that may utilize legitimate client 102 to request various network services, access content, data, and services, to initiate and participate in communications sessions, or to perform a variety of other functions. For example, the user 101 may utilize a web browser installed on the legitimate client 102 to access content that is supplied by a content provider that utilizes communications network 135 to deliver its content.

In certain embodiments, the legitimate client 102 may be a computer, a server, a mobile device, a gateway, a smartphone, a computer tablet, a phablet, or any other computing device. The legitimate client 102 may be a device that is a source of legitimate network traffic, rather than attack traffic. In one embodiment, the legitimate client 102 may include a memory 103 that includes instructions, and a processor 104 that executes the instructions from the memory 103 to perform various operations that are performed by the legitimate client 102. The processor 104 may be hardware, software, or a combination thereof. In FIG. 1, legitimate client 102 is illustratively shown as a smartphone device. The user 101 may utilize the legitimate client 102 to request and receive content, participate in communications sessions, access various types of software applications, perform work, perform any types of computing functions, or any combination thereof. For example, the user 101 may utilize the legitimate client 102 to access and obtain various types of content and services, such as, but not limited to, video content, audio content, web content, text content, speech-related services, gaming services, productivity services, work-related services, or any combination thereof. Additionally, the user 101 may make telephone calls, conduct chat sessions, send instant messages, send or receive data, or perform any other types of communications using the legitimate client 102. Furthermore, user 101 may utilize the legitimate client 102 to perform a variety of other tasks and functions. For example, the legitimate client 102 may be utilized to interact with any type of software applications, hardware, or any combination thereof. Legitimate client/source 120 may be configured to be similar to legitimate client 102 and may reside within communications network 105 and/or in communications network 135.

In certain embodiments, the legitimate client 102 may include a software application that may be a cloud-based application, gaming application, an internet-based application, a browser application, a mobile application, a productivity application, a video application, a music application, a social media application, a financial application, a news application, any other type of application, or a combination thereof. In certain embodiments, at least a portion of the software application may be configured to execute directly on the legitimate client 102, however, in other embodiments, the software application may be configured to execute on the other devices and components in the system 100. For example, at least a portion of the software application may be configured to execute on server 160, on a device in communications network 135, or any combination thereof.

Attack sources 110, 115 may include, but are not limited to, servers, routers, switches, or any other computing devices that may be directly or indirectly causing an attack on the system 100. In certain embodiments, the attack sources 110, 115 may reside within communications network 105, as shown in FIGS. 2-5, however, in other embodiments, the attack sources 110, 115 may reside outside communications network 105. The attack sources 110, 115 may be utilized to generate or carry out denial-of-service attacks, virus-based attacks, malware-based attacks, trojan-horse-based-attacks, worm-based attacks, or any other type of computer-based attack.

Notably, the functionality of the system 100 may be supported and executed by using any combination of the servers 140, 145, and 150 in the communications network 135 or outside of the communications network 135. In one embodiment, the server 140 may include a memory 141 that includes instructions, and a processor 142 that executes the instructions from the memory 141 to perform various operations that are performed by the server 140. In certain embodiments, the server 140 may be a node, router, or any other computing device configured to service traffic and/or provide content and data. For example, the server 140 may be an authoritative domain name service (DNS) server, a DNS resolver, or any other type of server. Illustratively, server 140 is shown as node 3 in FIGS. 2-5. Additionally, the server 145 may include a memory 146 that includes instructions, and a processor 147 that executes the instructions from the memory 146 to perform various operations that are performed by the server 145. In certain embodiments, the server 145 may be a node, router, or any other computing device configured to service traffic and/or provide content and data. For example, the server 145 may be an authoritative DNS server, a DNS resolver, or any other type of server. Illustratively, server 145 is shown as node 1 in FIGS. 2-5. Furthermore, the server 150 may include a memory 151 that includes instructions, and a processor 152 that executes the instructions from the memory 151 to perform various operations that are performed by the server 150. In certain embodiments, the server 150 may be a node, router, or any other computing device configured to service traffic and/or provide content and data. For example, the server 150 may be an authoritative DNS server, a DNS resolver, or any other type of server. Illustratively, server 150 is shown as node 2 in FIGS. 2-5. The processors 142, 147, and 152 may be hardware, software, or a combination thereof. In certain embodiments, the servers 140, 145, and 150 may be nodes, network servers, routers, gateways, computers, mobile devices or any other suitable computing device. In certain embodiments, the servers 140, 145, 150 may be configured to translate various types of addresses, such as word-based addresses, into internet protocol or other desired addresses. In certain embodiments, nodes 1, 2, and 3 may include any number of servers 140, 145, 150.

The system 100 may also include a DDoSDR server 165, which may be configured to include a memory 166 that includes instructions, and a processor 167 that executes the instructions from the memory 166 to perform various operations that are performed by the server 165. In certain embodiments, the server 165 may include a measurement collection module 170, a DDoSDR module 171, and a cloud controller 172, however, in other embodiments, the measurement collection module 170, the DDoSDR module 171, and/or the cloud controller 172 may reside on any other appropriate device in the system 100. In certain embodiments, the functions of the measurement collection module 170, the DDoSDR module 171, and/or the cloud controller 172 may be combined into a single module or any into any number of desired modules.

The measurement collection module 170 may be configured to receive network transaction measurements from the various measurement probes 180 in the system 100. In certain embodiments, the measurement collection module 170 may be a software program or a combination of hardware and software. The network transaction measurements may include, but are not limited to, a quantity of packets dropped at a node, an amount of traffic being sent and/or processed by a node, an amount of requests sent to a node, an amount of packets associated with a node, an amount of application transactions being conducted by a node, an amount of utilization of a processor of a node, an amount of utilization of a memory of a first node, any network measurement metric, or any combination thereof. The measurement probes 180 may be positioned on any link in the communications networks 105, 135, any link connected to the communications networks 105, 135, any other link, on any device in the system 100, or any combination thereof. In certain embodiments, the measurement probes 180 may be hardware devices, software, or a combination of hardware and software. The measurement probes 180 may be configured to obtain the network transaction measurements from any device in the system 100 in real-time, at continuous intervals, at fixed intervals, and/or at any selected time. For example, the measurement probes 180 may be configured to obtain network transaction measurements for servers 140, 145, 150, and transmit the network transaction measurements to the measurement collection module 170 and/or to the server 165 for further processing.

Once the network transaction measurements are received by the measurement collection module 170, the measurement collection module 170 may provide the network transaction measurements to the DDoSDR module 171 for analysis. The DDoSDR module 171 may be a software program or a combination of hardware and software. When the DDoSDR module 171 receives the network transaction measurements, the DDoSDR module 171 may analyze the measurements and compare the measurements to a baseline value and to one or more threshold values. In certain embodiments, the baseline value may be a value corresponding to normal and/or expected network-related conditions for a device in the system 100. The threshold value, for example, may be a value that indicates that an abnormal and/or unexpected network-related condition is occurring at a device associated with the analyzed network transaction measurement. If the DDoSDR module 171 determines that a received network transaction measurement for a particular device satisfies the threshold value, the DDoSDR module 171 may determine that an attack, such as a denial-of-service attack is occurring at the device. For example, if the network transaction measurement is a number of packets received at server 145 that is greater than a threshold value, the DDoSDR module 171 may determine that an attack is occurring at server 145. If, however, the network transaction measurement is a number of packets received at server 145 that is less than the threshold value, the DDoSDR module 171 may determine that an attack is not occurring.

Based on the comparison of the network transaction measurements to the baseline and/or threshold values, the DDoSDR module 171 may characterize an attack to one or more servers. When characterizing the attack, the DDoSDR module 171 may determine a type of attack that is occurring and may also identify which devices and links in the system 100 are experiencing the attack. If an attack is occurring at server 145, for example, legitimate traffic from clients 102, 120 may timeout or otherwise not be serviced at an acceptable rate. Legitimate traffic, in certain embodiments, may be network traffic that is not attack traffic. The DDoSDR module 171 may identify one or more alternate nodes/servers with availability for handling the legitimate traffic intended for server 145. The identified alternate nodes/servers may be located away from the attack, for example, on links in the system 100 that are not on links associated with attack traffic. As an example, the DDoSDR module 171 may identify server 140 as a server with available capacity. Once the alternate nodes/servers are identified, the DDoSDR module 171 may estimate a quantity of virtual machines and determine the type of virtual machines that need to be deployed at the alternate nodes/servers to handle the legitimate traffic that will be diverted to server 140. In certain embodiments, the virtual machines may be accessed via unicast or other addresses, and may include software, hardware, or both, that emulate the architecture and functions of a particular device in the system 100. For example, in this case, the virtual machines may emulate the functionality of attacked server 145 so as to provide the services normally provided by attacked server 145.

Additionally, the DDoSDR module 171 may estimate a number of sacrificial virtual machines and determine the type of sacrificial virtual machines that are to be deployed at sacrificial nodes 185 in the system. Sacrificial virtual machines may be virtual machines that are designed to absorb attack traffic, such as attack traffic occurring on links that the attack traffic is traversing. The sacrificial nodes 185 may be nodes, servers, or other computing devices that are located in proximity to or directly on links that the attack traffic is traversing. In certain embodiments, the sacrificial virtual machines may be accessed via anycast or other types of addresses. Once the estimations for the virtual machines to be deployed at the alternate nodes/servers and/or the estimations for the sacrificial virtual machines to be deployed are determined, the cloud controller 172 may utilize the estimations and/or any information generated by the DDoSDR module 171 to identify the appropriate virtual machine images for the virtual machines and the sacrificial virtual machines. The controller 172 may be software, hardware, or both. After the virtual machine images are identified, the controller 172 may launch, or otherwise deploy, the virtual machines and sacrificial virtual machines corresponding to the appropriate virtual machine images at the alternate nodes/servers and sacrificial nodes 185 respectively.

The controller 172 may provision the virtual machines at the alternate nodes/servers with the addresses or other identifiers of the alternate nodes/servers. Additionally, the controller 172 may provision the sacrificial virtual machines with the addresses or other identifiers of the sacrificial nodes 185 or any other selected node. Furthermore, the controller 172 may also be configured to provision access information, such as, but not limited to, addresses and host names, of the launched virtual machines at the parent nodes 175 and/or the service discovery servers 190 associated with the alternate nodes/servers. The parent nodes 175 may be nodes higher up in the network hierarchy than the alternate nodes/servers. For example, the parent node 175 may be a parent authoritative DNS server. The service discovery server 190 may be a computing device that serves as a repository for information relating to all services provided in the communications networks 105, 135. When the virtual machines and/or sacrificial virtual machines are launched, the legitimate clients 102, 120 may discover the new resources provided by the virtual machines launched at the alternate nodes/servers, such as via the parent nodes 175 and/or service discovery servers 190. The legitimate clients 102, 120 may then transmit requests for network services to the alternate nodes/servers so that the requests may be serviced by the alternate nodes/servers.

The communications network 135 of the system 100 may be any type of network and may be configured to link each of the devices in the system 100 to one another, and be configured to transmit, generate, and receive any information and data traversing the system 100. In one embodiment, the communications network 135 may include any number of additional servers in addition to the server 140, the server 145, and the server 150, and may be associated with an internet service provider. In certain embodiments, the communications network 135 may support domain name services, domain resolver services, broadcast capabilities, unicast capabilities, multicast capabilities, automatic multicast tunneling capabilities, any other network capabilities, or any combination thereof. The communications network 135 may also include and be connected to a cloud computing network, a content delivery network, a wireless network, an ethernet network, a satellite network, a broadband network, a cellular network, a private network, a cable network, the Internet, an internet protocol network, a multiprotocol label switching (MPLS) network, a content distribution network, a short-range wireless network (e.g. Bluetooth), a fiber optic network, a WiFi network, or any combination thereof. In one embodiment, the communications network 135 may be part of a single autonomous system that is located in a particular geographic region, or be part of multiple autonomous systems that span several geographic regions. Communications network 105 may be similar to communications network 105 and, in certain embodiments, may be the Internet. Links 122, 124, and 126, which correspond to link 1, link 2, and link 3 respectively in FIGS. 2-5 may be access links, peering links, or any type of link. In certain embodiments, as shown in FIGS. 1-5, lines 122, 124, and 126 may be links between communications networks 105 and 135.

The database 155 of the system 100 may be utilized to store and relay information that traverses the system 100, cache content that traverses the system 100, store data about each of the devices in the system 100 and perform any other typical functions of a database. In one embodiment, the database 155 may be connected to or reside within the communications network 135. Additionally, the database 155 may be connected to communications network 105. Furthermore, the database 155 may include a processor and memory or be connected to a processor and memory to perform the various operations associated with the database 155. In certain embodiments, the database 155 may be connected to servers 140, 145, and 150, server 160, DDoSDR server 165, the legitimate clients 102, 120, the measurement probes 180, the parent node 175, the sacrificial nodes 185, the service discovery server 190, or any combination thereof. The database 155 may also store communications traversing the system 100, store information relating to the network conditions occurring in the communications network 135, store network transaction measurements, store information about and/or identifying the attack sources 110, 115, store images for various types of virtual machines, store DNS records, store addresses for any of the devices in the system 100, store information associated with the sacrificial nodes 185, store information identifying the type and volume of each attack on the system 100, store information associated with any device in the system 100, store user preferences, store information about the user 101, store any information traversing the system 100, or any combination thereof. Furthermore, the database 155 may be configured to process queries sent to it by any device in the system 100 or otherwise.

Figure 2:
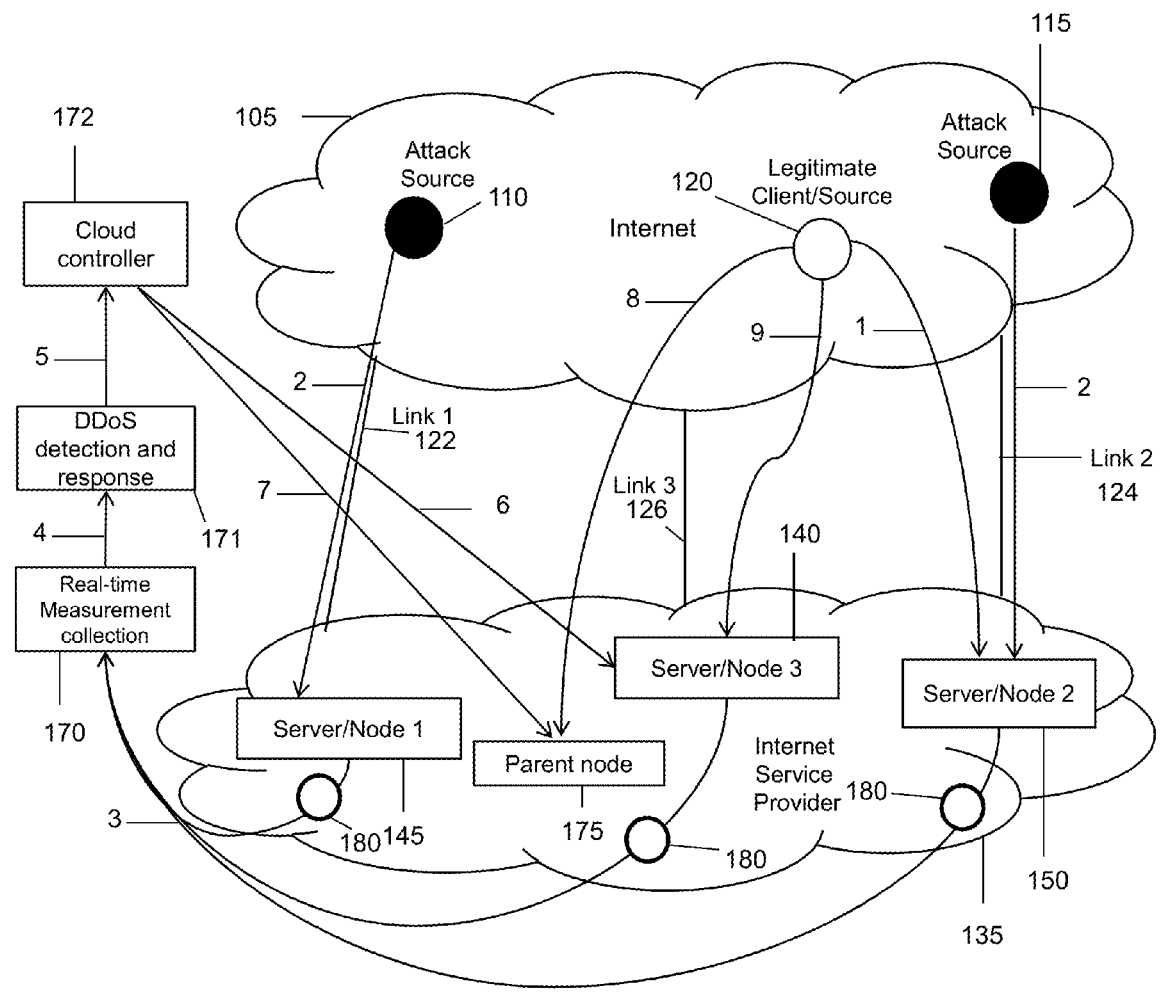
FIG. 2 is a schematic diagram illustrating a sample configuration of the system of FIG. 1, which is used for diffusing denial-of-service attacks for an authoritative domain name service that does not utilize anycast.

Operatively, the system 100 may diffuse denial-of-service attacks by using virtual machines in the following manner. In a first example use case scenario, as shown in FIG. 2, the system 100 may include legitimate client 120 associated with legitimate traffic and attack sources 110, 115 that generate, or are otherwise associated with, attack traffic. In FIG. 2, the system 100 may be configured to perform attack detection and response for an authoritative DNS service that does not include anycast capabilities. In this example, nodes 1-3 may be authoritative DNS servers and parent node 175 may be a parent authoritative DNS server. Legitimate client 120 may be a server or other computing device that normally accesses server 150/node 2 using an internet protocol address associated with node 2 to process requests for network services coming from legitimate client 120. For example, at line 1 in FIG. 2, the legitimate client 120 may transmit a request for a service to server 150/node 2. At lines 2, attack sources 110, 115 may launch an attack on servers 145, 150 (node 1 and node 2), which may be authoritative DNS servers. The attacks may be conducted over links 122 and 124. As the attack is occurring, requests from legitimate client 120 may begin to timeout at server 150/node 2.

Measurement probes 180 may obtain network transaction measurements for server 145/node 1, server 150/node 2, and server 140/node 3, and transmit the network transaction measurements to measurement collection module 170, as shown on lines 3. The network transaction measurements may indicate that server 145/node 1 and server 150/node 2 are overloaded due to heavy attack traffic from attack sources 110, 115. The measurement collection module 170 may transmit the network transaction measurements to DDoSDR module 171 for analysis, as shown on line 4 in FIG. 2. The DDoSDR module 171 may analyze the network transaction measurements and identify that nodes 1 and 2 are congested based on the analysis. Additionally, the DDoSDR module 171 may determine that server 140/node 3 is not being attacked and has available capacity to handle the legitimate traffic from legitimate client 120. The DDoSDR module 171 may also determine that server 140/node 3 is located in proximity to link 126 that is located away from the links 122 and 124 that are under attack. The DDoSDR module 171 may then determine the type of virtual machines and estimate a number of the virtual machines to be deployed at server 140/node 3. Once the determination and estimation is performed, the DDoSDR module 171 may provide the determination and estimation to the cloud controller 172, as shown on line 5 in FIG. 2.

The cloud controller 172 may deploy and provision the virtual machines estimated by the DDoSDR module 171 in server 140/node 3 with an internet protocol address for node 3, as shown on line 6. In certain embodiments, the virtual machines may be provisioned with internet protocol addresses for other nodes in the system 100 as necessary. At line 7, the cloud controller 172 may provision access information, such as internet protocol addresses and host names, of the deployed virtual machines at the parent node 175. Based on the provisioning, the legitimate client 120, as shown on line 8, may discover the new resources provided by the deployed virtual machines at server 140/node 3 based on the access information in parent node 175. Finally, as shown on line 9, the legitimate client 120 may then transmit requests to server 140/node 3, which will be handled and processed by the virtual machines deployed at server 140/node 3.

Figure 3:
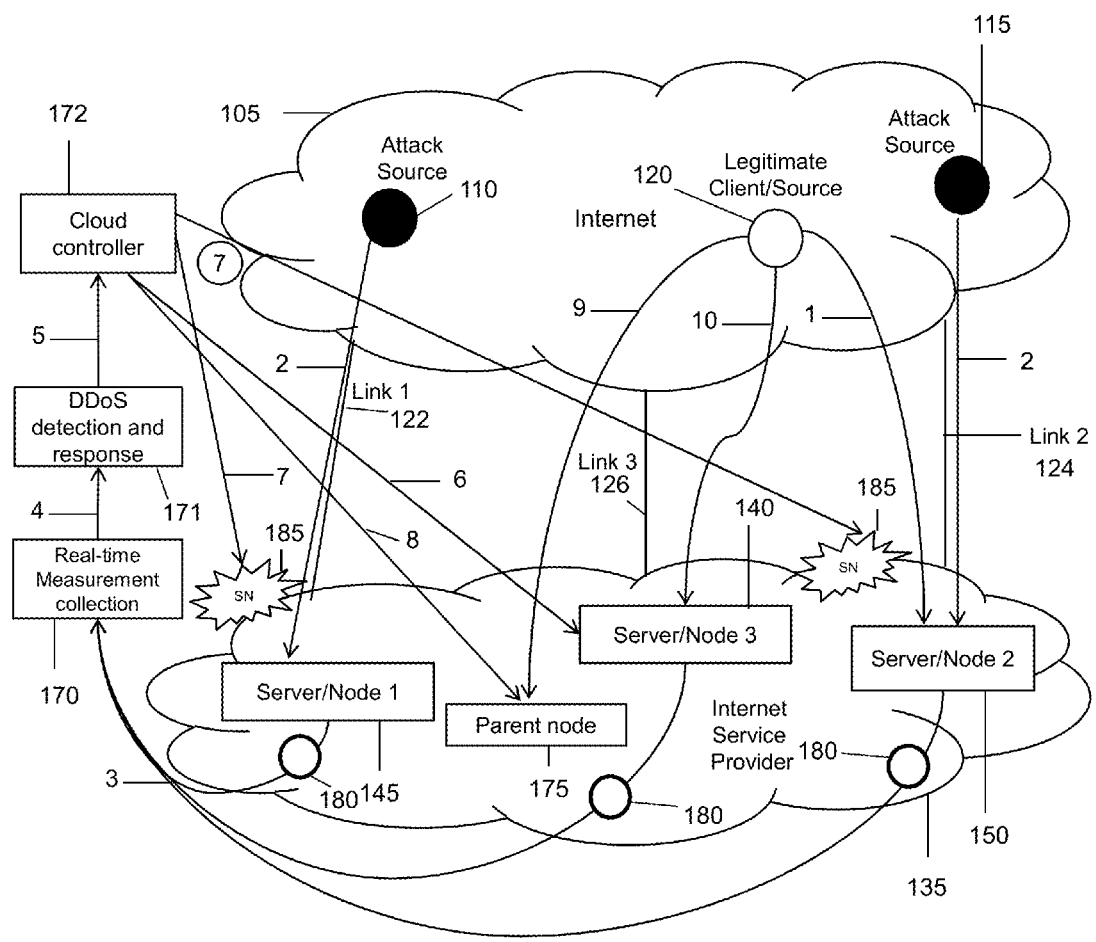
FIG. 3 is a schematic diagram illustrating a sample configuration of the system of FIG. 1, which is used for diffusing denial-of-service attacks for an authoritative domain name service that utilizes anycast.

In a second example use case scenario as shown in FIG. 3, the system 100 may include legitimate client 120 associated with legitimate traffic and attack sources 110, 115 that generate, or are otherwise associated with, attack traffic. In FIG. 3, the system 100 may be configured to perform attack detection and response for an authoritative DNS service that does include anycast capabilities. In this example, nodes 1-3 may be authoritative DNS servers and parent node 175 may be a parent authoritative DNS server. Legitimate client 120 may be a server or other computing device that normally accesses server 150/node 2 using an internet protocol address associated with node 2 to process requests for network services coming from legitimate client 120. For example, at line 1 in FIG. 3, the legitimate client 120 may transmit a request for a service to server 150/node 2. At lines 2 in FIG. 3, attack sources 110, 115 may launch an attack on servers 145, 150 (node 1 and node 2), which may be authoritative DNS servers. The attacks may be conducted over links 122 and 124. As the attack is occurring, requests from legitimate client 120 may begin to timeout at server 150/node 2.

Measurement probes 180 may obtain network transaction measurements for server 145/node 1, server 150/node 2, and server 140/node 3, and transmit the network transaction measurements to measurement collection module 170, as shown on lines 3. The network transaction measurements may indicate that server 145/node 1 and server 150/node 2 are overloaded due to heavy attack traffic from attack sources 110, 115. The measurement collection module 170 may transmit the network transaction measurements to DDoSDR module 171 for analysis, as shown on line 4 in FIG. 3. The DDoSDR module 171 may analyze the network transaction measurements and identify that nodes 1 and 2 are congested based on the analysis. Additionally, the DDoSDR module 171 may determine that server 140/node 3 is not being attacked and also has available capacity to handle the legitimate traffic coming from legitimate client 120. The DDoSDR module 171 may also determine that server 140/node 3 is located at a link 126 that is located away from the links 122 and 124 that are under attack. The DDoSDR module 171 may proceed to determine the type of virtual machines and estimate a number of the virtual machines to be deployed at server 140/node 3. Additionally, the DDoSDR module 171 may determine a type and number of sacrificial virtual machines to be deployed at sacrificial nodes 185. Once the determinations and estimations are performed, the DDoSDR module 171 may provide the determinations and estimations to the cloud controller 172, as shown on line 5 in FIG. 3.

The cloud controller 172 may deploy and provision the virtual machines estimated by the DDoSDR module 171 in server 140/node 3 with an anycast internet protocol address for node 3, as shown on line 6. In certain embodiments, the virtual machines may be provisioned with anycast internet protocol addresses for other nodes in the system 100 as necessary. At line 7, the cloud controller 172 may deploy and provision the sacrificial virtual machines at sacrificial nodes 185 that are in proximity to links 122 and 124 that are being attacked with the anycast internet protocol address for node 3. The sacrificial virtual machines may be utilized to absorb the attack traffic. At line 8, the cloud controller 172 may provision access information, such as internet protocol addresses and host names, of the deployed virtual machines at the parent node 175. In certain embodiments, the cloud controller 172 may also provision access information for the sacrificial virtual machines. Based on the provisioning, the legitimate client 120, as shown on line 9, may discover the new resources provided by the deployed virtual machines at server 140/node 3 based on the access information in parent node 175. Finally, as shown on line 10, the legitimate client 120 may then transmit requests to server 140/node 3, which will be handled and processed by the virtual machines deployed at server 140/node 3.

Figure 4:
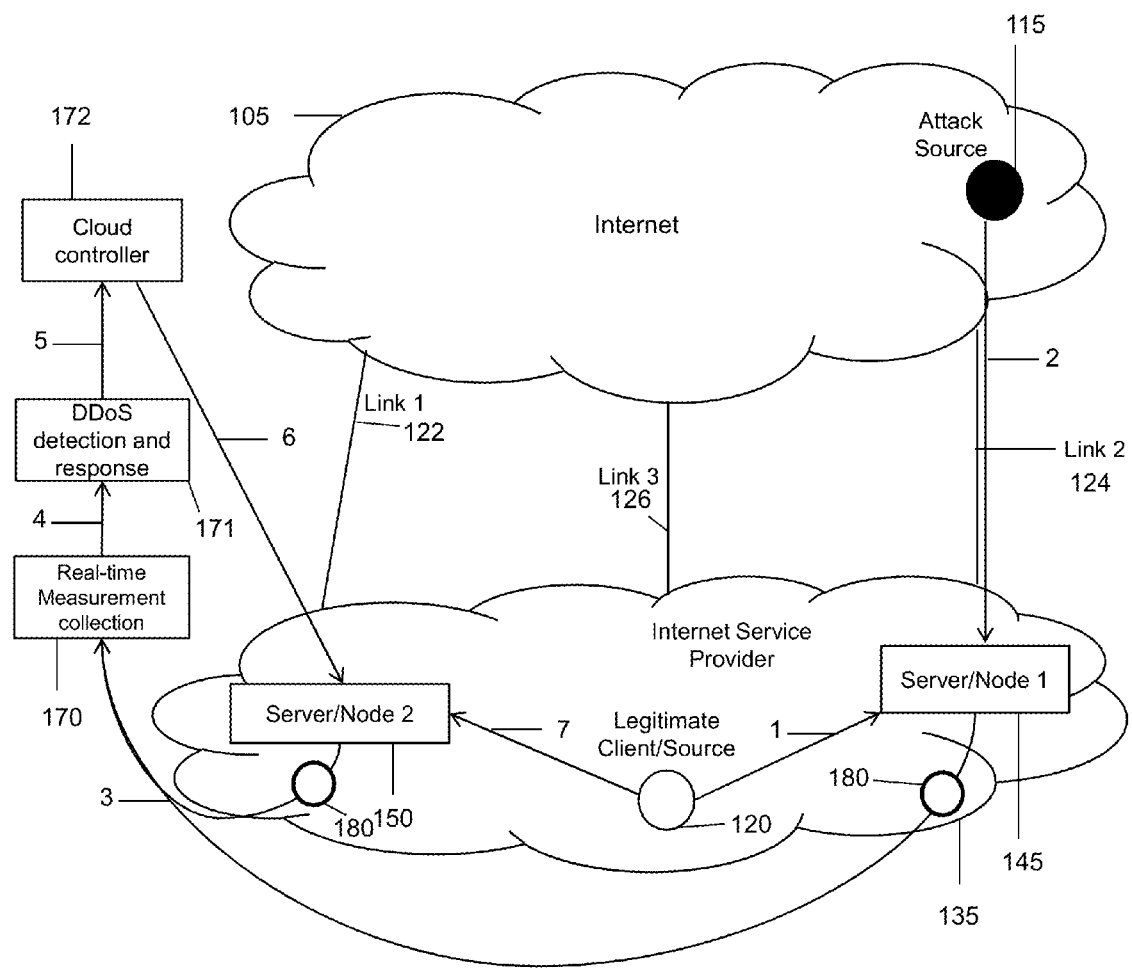
FIG. 4 is a schematic diagram illustrating a sample configuration of the system of FIG. 1, which is used for diffusing denial-of-service attacks for a resolver domain name service without service discovery services.

In a third example use case scenario as shown in FIG. 4, the system 100 may include legitimate client 120 associated with legitimate traffic and attack source 115 that generate, or are otherwise associated with, attack traffic. In FIG. 4, the system 100 may be configured to perform attack detection and response for a resolver DNS service that does not include a service discovery server 190. In this example, nodes 1-2 may be resolver DNS servers, and legitimate client 120 may be located in communications network 135. Legitimate client 120 may be a server or other computing device that normally accesses server 145/node 1 using an internet protocol address associated with node 1 to process requests for network services coming from legitimate client 120. Additionally, the legitimate client 120 may also normally access server 150/node 2 to process requests for network services. For example, at line 1 in FIG. 4, the legitimate client 120 may transmit a request for a resolver service to server 145/node 1. At line 2 in FIG. 4, attack source 115 may launch an attack on server 145/node 1. The attack may be conducted over link 124. As the attack is occurring, requests from legitimate client 120 may begin to timeout at server 145/node 1.

Measurement probes 180 may obtain network transaction measurements for server 145/node 1 and server 150/node 2, and transmit the network transaction measurements to measurement collection module 170, as shown on lines 3 in FIG. 4. The network transaction measurements may indicate that server 145/node 1 is overloaded due to heavy attack traffic from attack source 115. The measurement collection module 170 may transmit the network transaction measurements to DDoSDR module 171 for analysis, as shown on line 4 in FIG. 4. The DDoSDR module 171 may analyze the network transaction measurements and identify that node 1 is congested based on the analysis. Additionally, the DDoSDR module 171 may determine that server 150/node 2 is not being attacked and also has available capacity to handle the legitimate traffic coming from legitimate client 120. The DDoSDR module 171 may also determine that server 150/node 2 is located at a link, such as link 122, that is located away from link 124 that is under attack. The DDoSDR module 171 may proceed to determine the type of virtual machines and estimate a number of the virtual machines to be deployed at server 150/node 2. Once the determination and estimation are performed, the DDoSDR module 171 may provide the determination and estimation to the cloud controller 172, as shown on line 5 in FIG. 4.

The cloud controller 172 may deploy and provision the virtual machines estimated by the DDoSDR module 171 in server 150/node 2 with an internet protocol address for node 2, as shown on line 6. In certain embodiments, the virtual machines may be provisioned with internet protocol addresses for other nodes in the system 100 as necessary. At line 7, based on the provisioning, the legitimate client 120 may discover the new resources provided by the deployed virtual machines at server 150/node 2 when server 145/node 1 becomes unresponsive or at any other desired time. The legitimate client 120 may then shift requests to server 150/node 2, which will be handled and processed by the virtual machines deployed at server 150/node 2.

Figure 5:
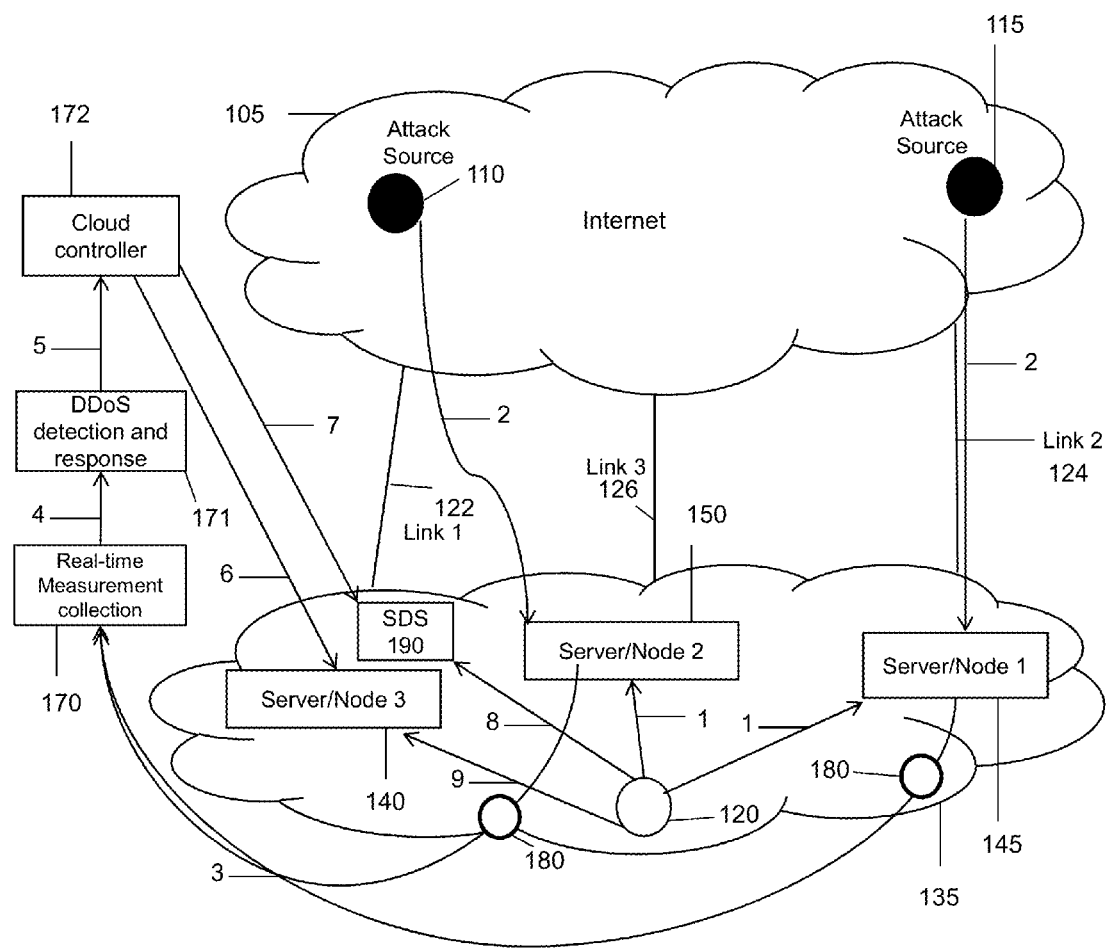
FIG. 5 is a schematic diagram illustrating a sample configuration of the system of FIG. 1, which is used for diffusing denial-of-service attacks for a resolver domain name service that utilizes service discovery services.

In a fourth example use case scenario as shown in FIG. 5, the system 100 may include legitimate client 120 associated with legitimate traffic and attack sources 110, 115 that generate, or are otherwise associated with, attack traffic. In FIG. 5, the system 100 may be configured to perform attack detection and response for a resolver DNS service that does include a service discovery server 190. In this example, nodes 1-3 may be resolver DNS servers, and legitimate client 120 may be located in communications network 135. Legitimate client 120 may be a server or other computing device that normally accesses server 145/node 1 using an internet protocol address associated with node 1 to process requests for network services coming from legitimate client 120. Additionally, the legitimate client 120 may also normally access server 150/node 2 to process requests for network services. For example, at line 1 in FIG. 5, the legitimate client 120 may transmit requests for resolver services to server 145/node 1 and server 150/node 2. At lines 2 in FIG. 5, attack sources 110, 115 may launch an attack on server 145/node 1 and server 150/node 2. The attacks may be conducted over link 124 and 126, for example. As the attack is occurring, requests from legitimate client 120 may begin to timeout at server 145/node 1 and server 150/node 2.

Measurement probes 180 may obtain network transaction measurements for server 145/node 1 and server 150/node 2, and transmit the network transaction measurements to measurement collection module 170, as shown on lines 3 in FIG. 5. The network transaction measurements may indicate that server 145/node 1 and server 150/node 2 are overloaded due to heavy attack traffic from attack sources 110, 115. The measurement collection module 170 may transmit the network transaction measurements to DDoSDR module 171 for analysis, as shown on line 4 in FIG. 5. The DDoSDR module 171 may analyze the network transaction measurements and identify that node 1 and node 2 are congested based on the analysis. Additionally, the DDoSDR module 171 may determine that server 140/node 3 is not being attacked and also has available capacity to handle the legitimate traffic coming from legitimate client 120 based on network measurements for server 140/node 3. The DDoSDR module 171 may also determine that server 140/node 3 is located at a link, such as link 122, that is located away from links 124 and 126 that are under attack. The DDoSDR module 171 may proceed to determine the type of virtual machines and estimate a number of the virtual machines to be deployed at server 140/node 3. Once the determination and estimation are performed, the DDoSDR module 171 may provide the determination and estimation to the cloud controller 172, as shown on line 5 in FIG. 5.

The cloud controller 172 may deploy and provision the virtual machines estimated by the DDoSDR module 171 in server 140/node 3 with an internet protocol address for node 3, as shown on line 6 of FIG. 5. In certain embodiments, the virtual machines may be provisioned with internet protocol addresses for other nodes in the system 100 as necessary. At line 7, the cloud controller 172 may provision the service discovery server 190 with the address of node 3. Once the legitimate client 120 times out at server 150/node 2 and/or server 145/node 1, the legitimate client 120 may discover the new resources provided by the deployed virtual machines at server 140/node 3 by sending a query to the service discovery server 190, as shown on line 8. At line 9, the legitimate client 120 may then shift requests to server 140/node 3, which will be handled and processed by the virtual machines deployed at server 140/node 3. Notably, the system 100 is not intended to be limited to the DNS context, but may be utilized for any type of network service that may be provided.

Notably, as shown in FIG. 1, the system 100 may perform any of the operative functions disclosed herein by utilizing the processing capabilities of server 160, the storage capacity of the database 155 or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, receiving network transaction measurements associated with various devices in the system 100, determining if the network transaction measurements satisfy thresholds for an attack, determining whether an attack is occurring at a node, identifying other nodes having a capacity for handling legitimate traffic, estimating a number of virtual machines to be deployed at the nodes having capacity, provisioning the virtual machines at the nodes having capacity, estimating a number of sacrificial virtual machines to be deployed at sacrificial nodes, processing legitimate traffic and/or attack traffic, and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIGS. 1-5 illustrates specific example configurations of the various components of the system 100, the system 100 may include any configuration of the components, which may include using a greater or lesser number of the components. For example, the system 100 is illustratively shown in FIGS. 1-5 as including a legitimate client 102, a legitimate client 120, communications networks 105, 135, attack sources 110, 115, a server 140, a server 145, a server 150, a database 155, a server 160, a DDoSDR server 165, a parent node 175, measurement probes 180, sacrificial nodes 185, and a service discovery server 190. However, the system 100 may include multiple legitimate clients 102, 120, multiple communications networks 105, 135, multiple attack sources 110, 115, multiple servers 140, 145, 150, 160, multiple databases 155, multiple DDoSDR servers 165, multiple parent nodes 175, additional measurement probes 180, additional sacrificial nodes 185, multiple service discovery servers 190, or any number of any of the other components in the system 100. Furthermore, in one embodiment, substantial portions of the functionality and operations of the system 100 may be performed by other networks and systems that may be connected to system 100.

Figure 6:
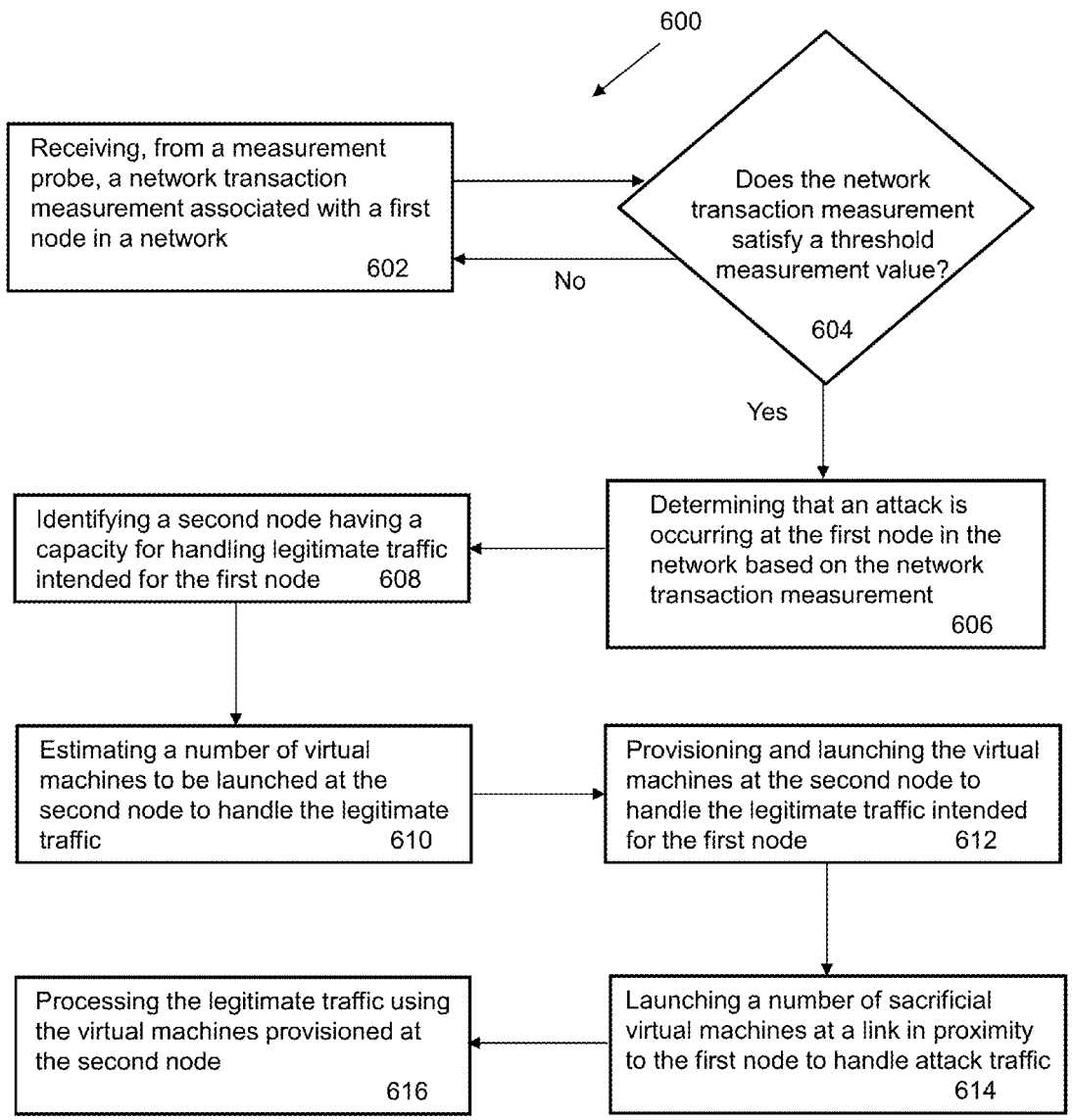
FIG. 6 is a flow diagram illustrating a sample method for diffusing denial-of-service attacks by using virtual machines according to an embodiment of the present disclosure.

As shown in FIG. 6, an exemplary method 600 for diffusing denial-of-service attacks by using virtual machines is schematically illustrated, and may include, at step 602, receiving, from a measurement probe 180, a network transaction measurement associated with a first node in a network, such as communications network 135. Network transaction measurements may also be obtained from any other node associated with the network. In certain embodiments, the network transaction measurement may include, but is not limited to, a quantity of packets dropped at the first node, an amount of traffic being sent and/or processed by the first node, an amount of requests sent to the first node, an amount of packets associated with the first node, an amount of application transactions being conducted by the first node, an amount of utilization of a processor of the first node, an amount of utilization of a memory of the first node, any network measurement metric, or any combination thereof. In certain embodiments, network transaction measurement may be transmitted by utilizing the measurement probe 180, the servers 140, 145, 150, any combination thereof, or by any other appropriate device. In certain embodiments, the network transaction measurement may be received by the measurement collection module 170, the DDoSDR module 171, the cloud controller 172, the server 165, any combination thereof, or by any other appropriate device.

At step 604, the method 600 may include determining if the network transaction measurement satisfies a threshold measurement value, such as a threshold measurement value indicative of an attack on the system 100. In certain embodiments, the determination may be performed by utilizing the DDoSDR module 171, the server 165, any combination thereof, or by any other appropriate device. The DDoSDR module 171 may analyze the network transaction measurements and compare the measurements to a baseline value, in addition to various threshold values corresponding to different types of attacks. If the comparison of the measurement to the threshold indicates the measurement does not satisfy the threshold, the method 600 may include reverting to step 602 and may include continuing to receive network transaction measurements. If, however, the comparison of the measurement to the threshold indicates the measurement satisfies the threshold, the method 600 may include, at step 606, characterizing and/or identifying that an attack is occurring at the first node in the system 100. The characterizing and/or identifying may include identifying one or more access links and/or peering links that correspond to network entry points for the attack. In certain embodiments, the characterization and identification may be performed by utilizing the DDoSDR module 171, the server 165, any combination thereof, or by any other appropriate device.

Once the attack is characterized and/or identified as occurring at the first node, the method 600 may include, at step 608, identifying a second node or additional nodes having a capacity for handling legitimate traffic intended to be handled by the first node. In certain embodiments, the identification of the second node or additional nodes may be performed by utilizing the DDoSDR module 171, the server 165, any combination thereof, or by any other appropriate device. For example, the DDoSDR module 171 may identify alternate servers and nodes away from access links or peering links associated with the first node that have available capacity for servicing legitimate traffic. Once the second node and/or additional nodes with capacity are identified, the method 600 may include, at step 610, estimating the number of virtual machines and determining the type of virtual machines that need to be deployed at each identified node with available capacity. In some embodiments, the method 600 may also include estimating a number of sacrificial virtual machines to be deployed at sacrificial nodes 185 or at other nodes in proximity to the attack. In certain embodiments, the estimating and the determining may be performed by utilizing the DDoSDR module 171, the server 165, any combination thereof, or by any other appropriate device.

After estimating the type of virtual machines and the number of virtual machines to be deployed at the nodes with available capacity, the method 600 may include, at step 612, provisioning and launching the estimated number of virtual machines at the nodes with available capacity that are away from access links and/or peering links associated with the first node. The virtual machines launched at the nodes with available capacity may be utilized to handle legitimate traffic and requests, such as traffic generated by legitimate clients 102, 120. Provisioning may include provisioning the virtual machines with an internet protocol address or other identifier associated with the nodes with the available capacity. Additionally, the method may include provisioning access information for each of the virtual machines that are to be added at the nodes with available capacity. The access information may include internet protocol addresses, host names, and/or other information corresponding to each of the virtual machines to be added at the nodes with available capacity. The access information, for example, may be provisioned at a parent node 175 of the nodes with available capacity and/or a service discovery server 190 associated with the nodes with available capacity. In certain embodiments, the provisioning and/or launching may be performed by utilizing the cloud controller 172, DDoSDR module 171, the server 165, any combination thereof, or by any other appropriate device.

At step 614, the method 600, may include launching and/or activating the sacrificial virtual machines at the sacrificial nodes 185 to assist in absorbing the attack traffic, such as attack traffic from attack sources 110, 115. In certain embodiments, the launching and/or activation may be performed by utilizing the cloud controller 172, DDoSDR module 171, the server 165, any combination thereof, or by any other appropriate device. Once the virtual machines and/or sacrificial virtual machines are provisioned and/or activated, the method 600 may include, at step 616, utilizing the virtual machines deployed at the nodes away from the attack to process the legitimate traffic, such as traffic coming from legitimate clients 102, 120. The legitimate clients 102, 120 may determine that the legitimate traffic should be sent to the virtual machines deployed at the nodes away from the attacked based on the provisioning and/or based on accessing a parent node 175 and/or a service discovery server 190. While the virtual machines deployed at the nodes away from the attack are processing the legitimate traffic, the sacrificial virtual machines deployed at the sacrificial nodes 185 may be processing, or otherwise absorbing, the attack traffic. In certain embodiments, the processing of the legitimate traffic may be performed by utilizing the virtual machines deployed at the nodes away from the attack or by utilizing any other appropriate device. In certain embodiments, the processing and/or absorbing of the attack traffic may be performed by utilizing the sacrificial virtual machines, the sacrificial nodes 185, and or by utilizing any other appropriate device. Notably, the method 600 may incorporate any of the functionality of the system 100 or any other functionality described in the present disclosure.

Notably, the system 100 and methods disclosed herein may include additional functionality and features. In certain embodiments, for example, the system 100 and methods may include rapidly informing the legitimate clients 102, 120 of the new available resources at the nodes identified with available capacity by utilizing DNS records with short time-to-live values. For example, a portion of the system 100 may be provisioned to notify the legitimate clients 102, 120 if requests sent by the legitimate clients 102, 120 are timing out at a particular node. If, for example, parent node 175 is provisioned with information identifying other nodes with capacity, then the information may be cached for the time-to-live value of a record including the information. As an alternative to using records with short time-to-live values, the system 100 and methods may also include utilize the service discovery server 190 to inform the legitimate clients 102, 120 of new nodes with available resources. As a further alternative, the system 100 and methods may include notifying the legitimate clients 102, 120 by directly providing a route to the new nodes with resources that are using the deployed virtual machines.

Additionally, in certain embodiments, attacked nodes (e.g. servers/nodes 145, 150 from FIG. 2), may be configured to provide a portion of content and/or services even when under attack by the attack sources 110, 115. For example, servers 145, 150 may be configured to serve only the index.html file of a given website, while other portions of the website may be served by the virtual machines deployed at server 140 that may be located away from the attack. As an example, web pages including media content, such as video content, image content, and/or audio content may be served by the virtual machines deployed at server 140. Furthermore, in certain embodiments, an authoritative DNS or other server that serves multiple zones may be enhanced by utilizing multiple new virtual machines in the communications network 135 and/or communications network 105. Each of the new virtual machines may be configured to serve a subset of the zones served by the authoritative DNS or other server.

Figure 7:
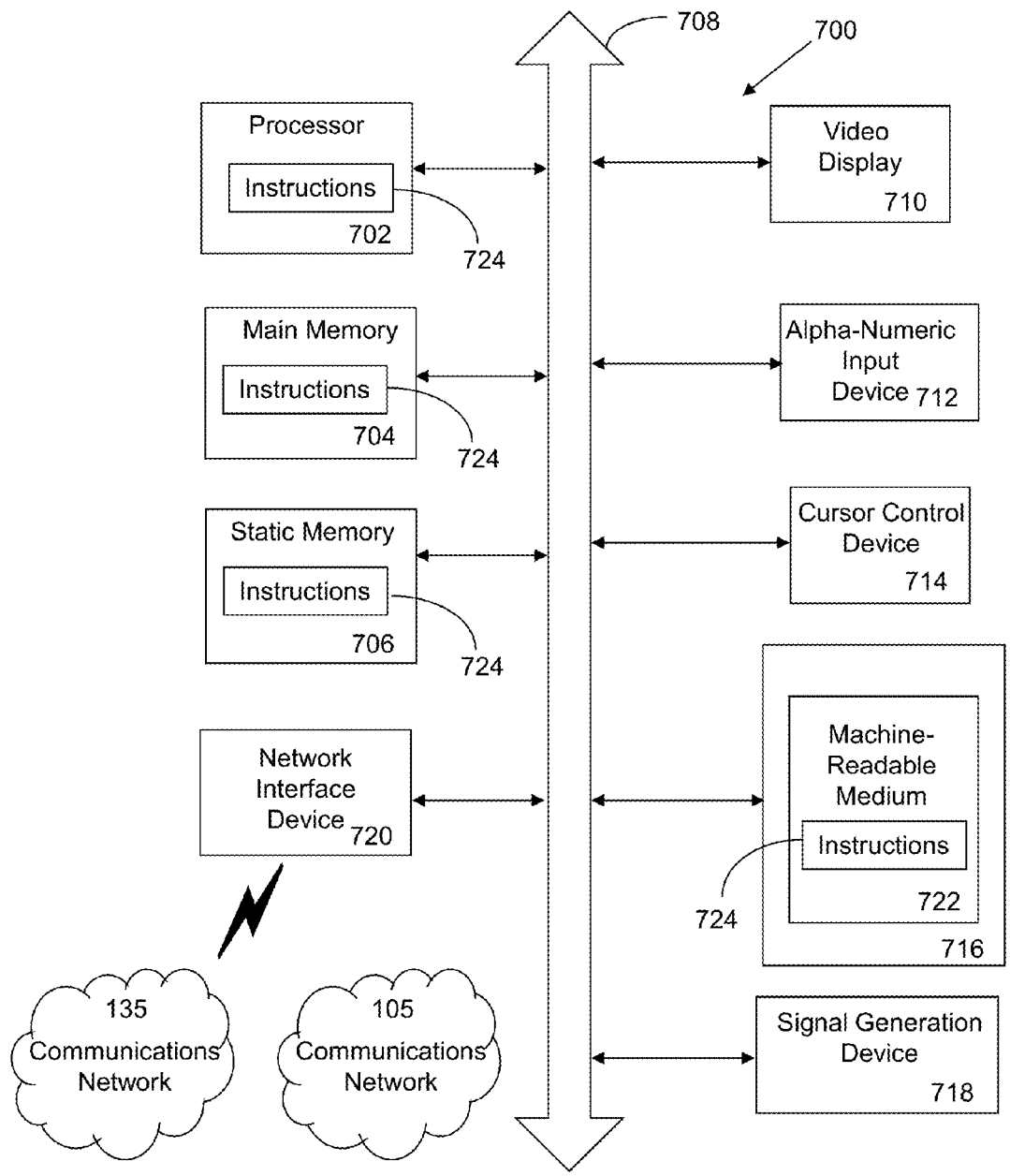
FIG. 7 is a schematic diagram of a machine in the form of a computer system within which a set of instructions, when executed, may cause the machine to perform any one or more of the methodologies or operations of the systems and methods for diffusing denial-of-service attacks by using virtual machines.

Referring now also to FIG. 7, at least a portion of the methodologies and techniques described with respect to the exemplary embodiments of the system 100 can incorporate a machine, such as, but not limited to, computer system 700, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 105, communications network 135, another network, or a combination thereof) to and assist with operations performed by other machines, such as, but not limited to, the legitimate client 102, the legitimate client 120, the server 140, the server 145, the server 150, the database 155, the server 160, the DDoSDR server 165, the parent node 175, the measurement probes 180, the sacrificial nodes 185, the service discovery server 190, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710, which may be, but is not limited to, a liquid crystal display (LCD), a flat panel, a solid state display, or a cathode ray tube (CRT). The computer system 700 may include an input device 712, such as, but not limited to, a keyboard, a cursor control device 714, such as, but not limited to, a mouse, a disk drive unit 716, a signal generation device 718, such as, but not limited to, a speaker or remote control, and a network interface device 720.

The disk drive unit 716 may include a machine-readable medium 722 on which is stored one or more sets of instructions 724, such as, but not limited to, software embodying any one or more of the methodologies or functions described herein, including those methods illustrated above. The instructions 724 may also reside, completely or at least partially, within the main memory 704, the static memory 706, or within the processor 702, or a combination thereof, during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 722 containing instructions 724 so that a device connected to the communications network 105, the communications network 135, other network, or a combination thereof, can send or receive voice, video or data, and to communicate over the communications network 105, the communications network 135, other network, or both, using the instructions. The instructions 724 may further be transmitted or received over the communications network 105, the communications network 135, other network, or a combination thereof, via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device, or "computer-readable device" shall accordingly be taken to include, but not be limited to: memory devices, solid-state memories such as a memory card or other package that houses one or more read-only (non-volatile) memories, random access memories, or other rewritable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

I claim:

1. A system, comprising:
   a memory that stores instructions;
   a processor that executes the instructions to perform operations, the operations comprising:
   receiving, from a measurement probe, a network transaction measurement associated with a first node in a network;
   determining if the network transaction measurement satisfies a threshold measurement value;
   determining, if the network transaction measurement satisfies the threshold measurement value, that an attack is occurring at the first node in the network;
   identifying a second node having a capacity for handling traffic intended for the first node;
   launching a first quantity of virtual machines at the second node to handle legitimate traffic of the traffic intended for the first node;
   estimating a second quantity of virtual machines to serve as sacrificial virtual machines; and
   launching the second quantity of virtual machines at a sacrificial node in proximity to a link associated with the first node.

2. The system of claim 1, wherein the operations further comprise estimating the first quantity of virtual machines to be launched at the second node based on the network transaction measurement.

3. The system of claim 2, wherein the operations further comprise identifying a type of virtual machine image to be utilized for the first quantity of virtual machines.

4. The system of claim 1, wherein the operations further comprise provisioning the first quantity of virtual machines with an anycast address associated with the second node.

5. The system of claim 1, wherein the operations further comprise transmitting a notification to a client associated with the legitimate traffic of the traffic, wherein the notification indicates that the client should transmit the legitimate traffic to the second node instead of transmitting the legitimate traffic to the first node.

6. The system of claim 1, wherein the operations further comprise serving a first portion of a network resource at the first node and serving a second portion of the network resource using the first quantity of virtual machines at the second node.

7. The system of claim 1, wherein the operations further comprise provisioning a parent node with an address and a hostname of the second node.

8. The system of claim 7, wherein the operations further comprise enabling a client associated with the legitimate traffic to discover the second node via the parent node.

9. The system of claim 1, wherein the operations further comprise determining a network entry point of the attack based on the network transaction measurement.

10. A method, comprising:
    receiving, from a measurement probe, a network transaction measurement associated with a first node in a network;
    determining if the network transaction measurement satisfies a threshold measurement value;
    determining, if the network transaction measurement satisfies the threshold measurement value, that an attack is occurring at the first node in the network;

identifying, by utilizing instructions from memory that are executed by a processor, a second node having a capacity for handling traffic intended for the first node;

launching a first quantity of virtual machines at the second node to handle legitimate traffic of the traffic intended for the first node;

estimating a second quantity of virtual machines to serve as sacrificial virtual machines; and launching the second quantity of virtual machines at a sacrificial node in proximity to a link associated with the first node.

11. The method of claim 10, further comprising estimating the first quantity of virtual machines to be launched at the second node based on the network transaction measurement.

12. The method of claim 10, further comprising transmitting a notification to a client associated with the legitimate traffic of the traffic.

13. The method of claim 10, further comprising identifying a type of virtual machine image to be utilized for the first quantity of virtual machines.

14. The method of claim 10, further comprising provisioning the first quantity of virtual machines with an address associated with the second node.

15. The method of claim 10, further comprising serving a first portion of a network resource at the first node and serving a second portion of the network resource using the first quantity of virtual machines at the second node.

16. The method of claim 10, further comprising provisioning a service discovery server with an address of the second node.

17. The method of claim 16, further comprising receiving, at the service discovery server, a query from a client associated with the legitimate traffic of the traffic, and further comprising providing, via the service discovery server, the address of the second node to the client.

18. The method of claim 10, further comprising determining a network entry point of the attack based on the network transaction measurement.

19. A computer-readable device comprising instructions, which when executed by a processor, cause the processor to perform operations comprising:

receiving, from a measurement probe, a network transaction measurement associated with a first node in a network;

determining if the network transaction measurement satisfies a threshold measurement value;

determining, if the network transaction measurement satisfies the threshold measurement value, that an attack is occurring at the first node in the network;

identifying a second node having a capacity for handling traffic intended for the first node;

launching a first quantity of virtual machines at the second node to handle legitimate traffic of the traffic intended for the first node;

estimating a second quantity of virtual machines to serve as sacrificial virtual machines; and launching the second quantity of virtual machines at a sacrificial node in proximity to a link associated with the first node.

20. The computer-readable device of claim 19, wherein the operations further comprise estimating the first quantity of virtual machines to be launched at the second node based on the network transaction measurement.

* * * * *